(12) United States Patent  (10) Patent No.: US 6,302,088 B1
Kato  (45) Date of Patent: Oct. 16, 2001

(54) FUEL INJECTOR MOUNTING CONSTRUCTION FOR ENGINE

(75) Inventor: Masahiko Kato, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/386,269

(22) Filed: Aug. 31, 1999

(30) Foreign Application Priority Data

Aug. 31, 1998 (JP) ................................................. 10-244546

(51) Int. Cl.$^7$ ................................................... F02M 55/02
(52) U.S. Cl. .......................................... 123/470; 123/468
(58) Field of Search ..................... 123/470, 468, 123/469, 508, 456

(56) References Cited

U.S. PATENT DOCUMENTS

| | | | |
|---|---|---|---|
| 4,203,402 | * | 5/1980 | Freyn .................................... 123/470 |
| 4,206,725 | * | 6/1980 | Jenkel et al. ........................... 123/470 |
| 4,829,646 | * | 5/1989 | Cigolotti et al. ................... 29/888.01 |
| 4,938,193 | * | 7/1990 | Raufeisen et al. .................... 123/470 |
| 5,566,658 | * | 10/1996 | Edwards et al. ...................... 123/470 |

* cited by examiner

Primary Examiner—Henry C. Yuen
Assistant Examiner—Mahmoud Gimie
(74) Attorney, Agent, or Firm—Knobbe, Martens, Olson & Bear, LLP

(57) ABSTRACT

A fuel injector mounting construction for an engine includes an improved thrust member. The engine is a direct injected, internal combustion engine. A fuel injector is provided for spraying fuel into a combustion chamber and inserted into an opening formed in a cylinder head. The fuel injector has a contact surface for receiving a loading or thrust force. The contact surface extends about the nozzle of the fuel injector. A seal member is provided for sealing a space between the fuel injector and the opening. The thrust member has a fixing section and a thrust section. A fixing member affixes the thrust member onto the cylinder head at the fixing section and thereby loads the thrust section onto the contact surface to exert a upon the contact surface toward the combustion chamber. At least one of the thrust section and the fixing section has a convex surface. The convex surface allows for varying orientations of the thrust member when mounted onto the cylinder head and thereby permits the thrust member to squarely load the contact surface, such that the force is substantially uniform about the contact surface, despite manufacturing tolerance stack-ups.

30 Claims, 11 Drawing Sheets

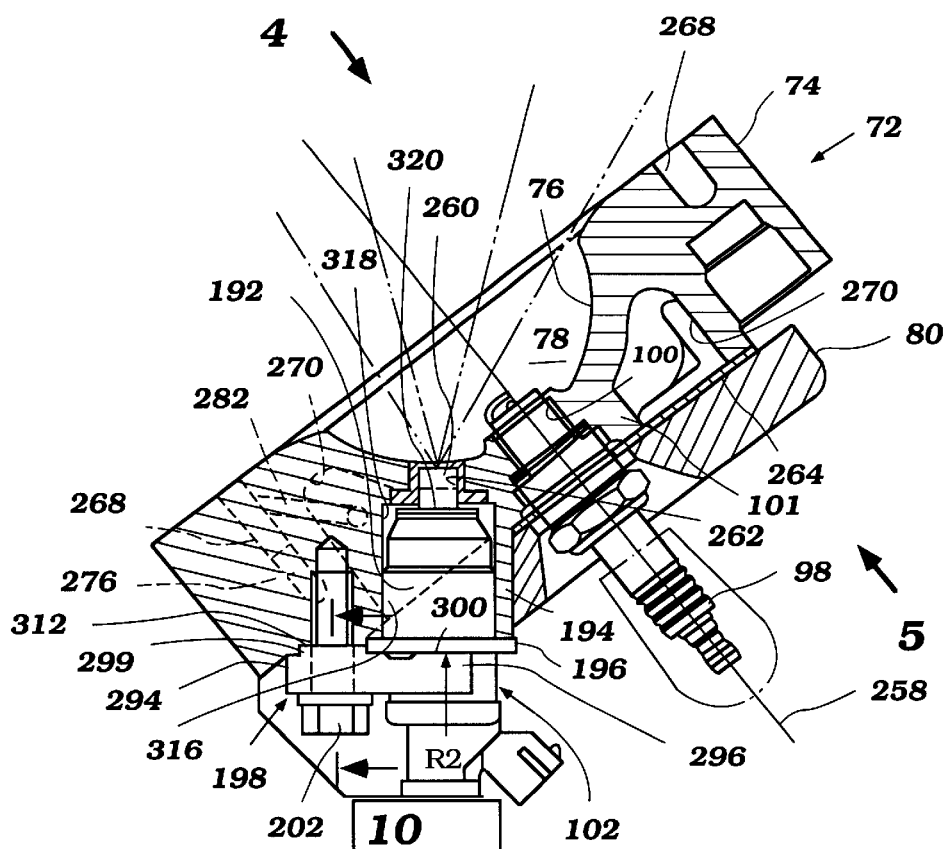
Figure 8
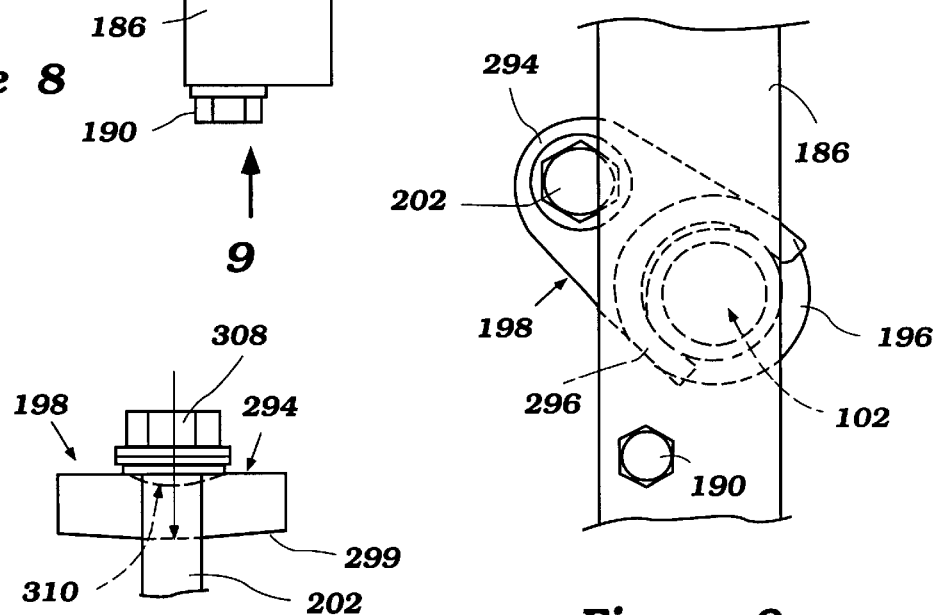
Figure 10
Figure 9

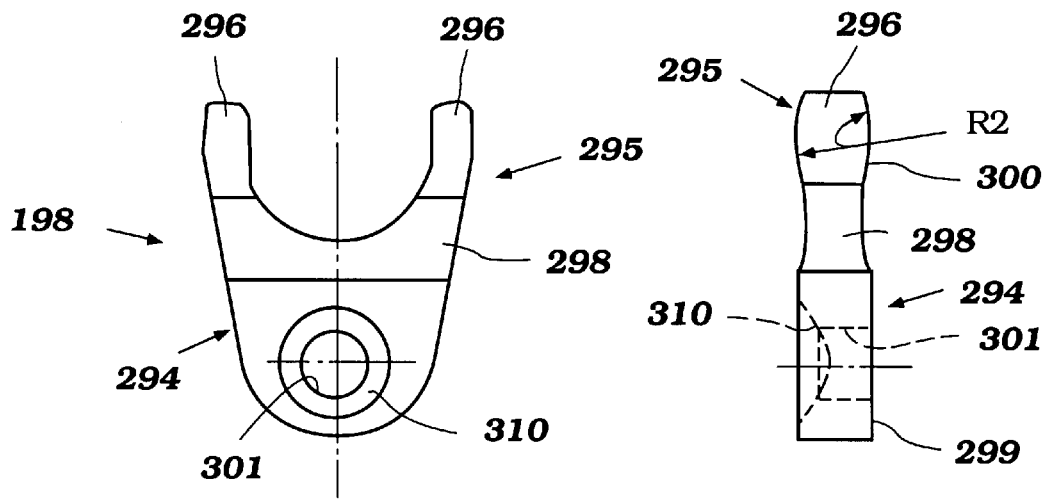
*Figure 11(A)*
*Figure 11(C)*
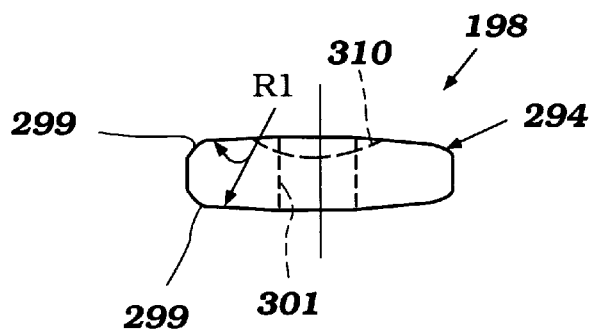
*Figure 11(B)*
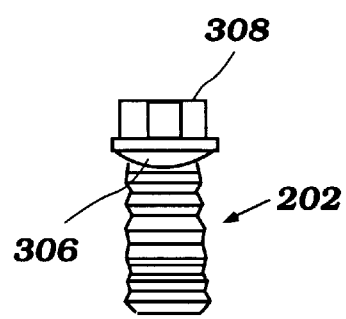
*Figure 12*

FUEL INJECTOR MOUNTING CONSTRUCTION FOR ENGINE

BACKGROUND OF THE INVENTION

1. Field of the Invention

This invention relates to a fuel injector mounting construction for an in internal combustion engine, and more particularly to an improved fuel injector mounting construction on a direct injected engine that can securely hold a fuel injector notwithstanding manufacturing tolerances.

2. Description of Related Art

In all fields of engine design, there is an increasing emphasis on obtaining more effective emission control, better fuel economy and, at the same time, continued high power output. This trend has resulted in the substitution of fuel injection systems for carburetors as the engine charge former. In the common systems used, fuel is injected into an intake air manifold. In order to obtain still further improvement, direct injection systems are being considered. These systems inject fuel directly into the combustion chamber and thus have significant potential advantages such as fine emission control.

An injection nozzle of a fuel injector employed in a conventional direct injection system is exposed to a combustion chamber through an opening formed in a cylinder head assembly. A forked member usually is used to affix the fuel injector onto the cylinder head assembly. The forked member is secured to the cylinder head assembly with a fastener such as a bolt. Meanwhile, the forked member contacts the body of the fuel injector with its forked section to push a flange of the fuel injector toward the combustion chamber so that the injection nozzle of the fuel injector can be exposed to the combustion chamber.

The fuel injector often has a mount section between the flange and the injection nozzle. This mount section has a diameter larger than a diameter of the injection nozzle but smaller than a diameter of the flange.

The cylinder head opening includes two sections: a small diameter opening section and a large diameter opening sections. A generally square step occurs at the transition between the two opening sections.

The mount section of the fuel injector is seated at this step portion and loaded by the forked member. A seal member, such as a disc spring, conventionally is provided between the mount section of the fuel injector and the step portion to seal up this area.

On occasion, the loading on the fuel injector and thus on the seal can be non-uniform around the seal and can be less than a desired loading. The effectiveness of the seal thus is jeopardized. This occurs because the configuration of the forked member and the surface of the cylinder head on which it is mounted vary due to manufacturing tolerances. If these tolerances stack-up adversely, the forked member does not squarely load the fuel injector, and thus the loading around the seal is not uniform. At the extreme, the fuel injector can assume a noticeably skewed orientation relative to a central axis of the opening in which is mounted.

Hot gases and flames can leak through the seal if the fork member does not properly load the fuel injector and compress the seal. That is, if the seal is not uniform and one section of the seal is not properly compressed, hot gases and flames will leak through the improperly loaded section of the seal. The injector nozzle consequently is excessively heated and deposits can form on the nozzle. These deposits can block and clog the nozzle apertures thereby preventing proper fuel injection and effecting engine performance and emission control.

SUMMARY OF THE INVENTION

A need therefore exists for a mounting construction of the fuel injector that consistently produces an effective seal between fuel injector and the engine body.

In accordance with one aspect of the present invention, a direct fuel injected, internal combustion engine comprises an engine body defining, at least in part, at least one combustion chamber. A fuel injector is arranged to spray fuel directly into the combustion chamber. The engine body has an opening through which the fuel injector is inserted, and the fuel injector having a contact surface. A thrust member is arranged to exert a loading onto the contact surface toward the combustion chamber, and a fixing member affixes the thrust member onto the engine body. A sealing member is disposed within a space between the fuel injector and the opening. The thrust member includes a thrust section contacting the contact surface of the fuel injector and a fixing section at which the thrust member is affixed onto the engine body by the fixing member. At least one of the thrust section and the fixing section having a convex surface.

The convex surface allows for varying orientations of the thrust member relative to the engine body when mounted to the engine body. The thrust member in this manner can squarely load the fuel injector contact surface such that the applied force is substantially uniform about the contact surface despite manufacturing tolerance stack-ups. The generally uniform pressure about the contact surface at a desired loading produces uniform pressure about the sealing member to produce an effective seal between the fuel injector and the engine body, thereby inhibiting overheating of the fuel injector and deposit formations on a fuel injector nozzle.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention, and which;

FIG. 8 is a cross-sectional plan view showing a preferred embodiment of a mounting construction for a fuel injector onto a cylinder head assembly;

FIG. 9 is an enlarged partial elevational view showing the same mounting construction taken in the direction from the arrow 9 in FIG. 8;

FIG. 10 is an enlarged partial cross-sectional view showing the same mounting construction taken along the line 10—10 in FIG. 8;

FIGS. 11(A) to (C) show a thrust member used for mounting the fuel injector; FIGS. 11(A), (B), (C) are a top plan view, a lateral side view and a longitudinal side view, respectively;

FIG. 12 is an elevational side view of a bolt of the mounting construction;

DETAILED DESCRIPTION OF THE PREFERRED EMBODIMENTS OF THE INVENTION

Figure 1:
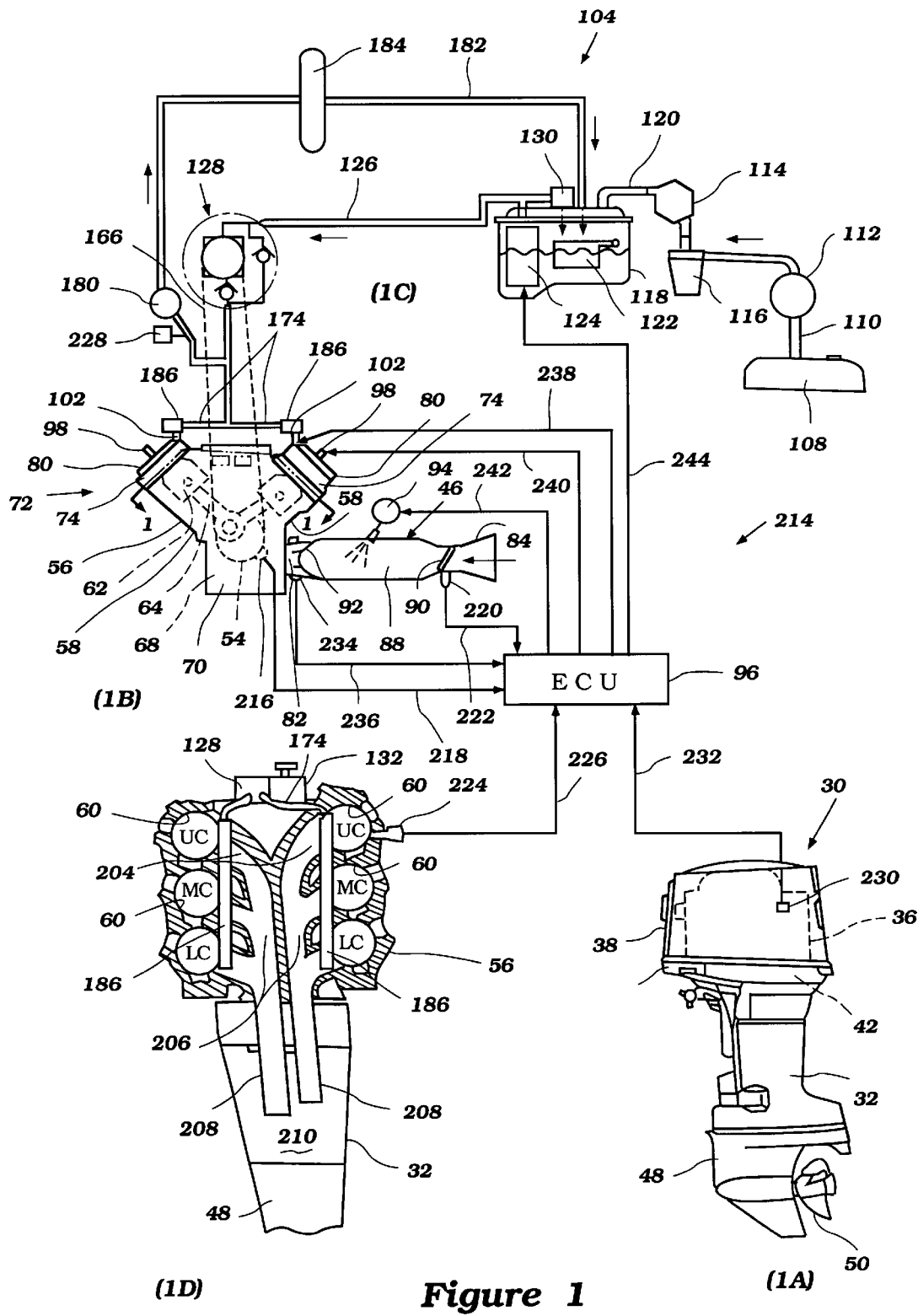
FIG. 1 is a schematic view of an engine which is configured in accordance with the preferred embodiment of the present invention as employed on an outboard motor, and illustrates in Sections 1A the outboard motor from a side elevational view, illustrates in Sections 1B and 1C a partial schematic view of the engine with associated portions of induction and fuel supply systems, illustrates in Section 1D a sectional view of the engine (as taken along line I—I of the Section 1B) and a portion of a driveshaft housing of the outboard motor, and illustrates an electronic control unit (ECU) of an engine control system communicating with various sensors and controlled components of the engine.

The general overall environment in which the invention is practiced and certain details of the engine will be described primarily with reference to FIG. 1.

In FIG. 1A, an outboard motor constructed and operated in accordance with an embodiment of the invention is depicted in side elevational view and is identified generally by the reference numeral 30.

The entire outboard motor 30 is not depicted in that the swivel bracket and clamping bracket that are associated with the driveshaft housing, indicated generally by the reference numeral 32, are not illustrated. This is because these components are well known in the art and the specific method by which the outboard motor 30 is mounted to the transom of an associated watercraft is not necessary to permit those skilled in the art to understand or practice the invention.

The outboard motor 30 includes a power head, indicated generally by the reference numeral 34, that is positioned above the driveshaft housing 32 and which includes a powering internal combustion engine, indicated generally by the reference numeral 36. This engine 36 is shown in more detail in the remaining two views of this figure and will be described shortly by reference thereto.

The power head 34 is completed by a protective cowling which includes a top cowling member 38 and a bottom cowling 40. This top cowling member 38 is detachably connected to the bottom cowling member 40 which is a lower tray portion of the protective cowling and encircles an upper portion of the driveshaft housing 32, particularly an exhaust guide 42 for an exhaust system of the engine 36.

The top cowling member 38 has a pair of compartments (not shown) placed at rear and both sides of its body. The compartments open rearward so that air is introduced into these compartments. Air inlet barrels 44 (see FIG. 2), which have no bottom portion, stand in the respective compartments. The air inlet barrels 44 look like a funnel and the compartments are connected with interior of the top cowling member 38 through the air inlet barrel 44. Thus, the air is admitted into interior of the top cowling member 38 and then goes to an air induction system, indicated generally by the reference numeral 46.

Positioned beneath the driveshaft housing 32 is a lower unit 48 in which a propeller 50, which forms the propulsion device for the associated watercraft, is journaled.

As is typical with outboard motor practice, the engine 36 is supported in the power head 34 so that its crankshaft or output shaft 54 (see the upper view) rotates about a vertically extending axis. This is done so as to facilitate connection of the crankshaft 54 to a driveshaft (not shown) which depends into the driveshaft housing 32 and which drives the propeller 50 through a conventional forward, neutral, reverse transmission contained in the lower unit 48.

The details of the construction of the outboard motor 30 and the components which are not illustrated may be considered to be conventional or of any type known to those wishing to utilize the invention disclosed herein. Those skilled in the art can readily refer to any known constructions with which to practice the invention.

With reference now in detail to the construction of the engine 36 still by primary reference to FIG. 1, in the illustrated embodiment, the engine 36 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations.

Also, although the engine 36 will be described as operating on a two stroke principle, it will also be apparent to those skilled in the art that almost all facets of the invention can be employed in conjunction with four stroke engines as noted later.

The engine 36 comprises a cylinder block 56 that is formed with a pair of cylinder banks 58. Each of these cylinder banks 58 is formed with three vertically spaced, horizontally extending cylinder bores 60. Pistons 62 reciprocate in these cylinder bores 60. The pistons 62 are, in turn, connected to the upper or small ends of connecting rods 64. The big ends of these connecting rods 64 are journaled on the throws of the crankshaft 54 in a manner that is well known in this art.

The crankshaft 54 is journaled in a suitable manner for rotation within a crankcase chamber 68 that is formed in part by a crankcase member 70 that is affixed to the cylinder block 56 in a suitable manner. The cylinder block 56 and the crankcase member 70 generally define an engine body. As is typical with two stroke engines, the crankshaft 54 and crankcase chamber 68 are formed with seals so that each section of the crankcase that is associated with one of the cylinder bores 60 will be sealed from the others. This type of construction is well known in the art.

A cylinder head assembly, indicated generally by the reference numeral 72, is affixed to the end of the cylinder banks 58 that are spaced from the crankcase chamber 68. These cylinder head assemblies 72 are comprised of a main cylinder head member 74 that defines a plurality of recesses 76 (see FIG. 8) in its lower face. Each of these recesses 76 corporate with the respective cylinder bore 60 and the head of the piston 62 to define the combustion chambers 78 of the engine 36. This is also well known in the art. A cylinder head cover member 80 completes the cylinder head assembly 72. The main cylinder head members 74 and the cylinder block 56 are affixed to each other and to the respective cylinder banks 58 in a suitable, known manner.

The air induction system 46 is provided for delivering an air charge to the sections of the crankcase chamber 68 associated with each of the cylinder bores 60. This communication is via an intake port 82 formed in the crankcase member 70 and registering with each such crankcase chamber section.

The induction system 46 includes an air silencing and inlet device, shown schematically in this figure and indicated by the reference numeral 84. The actual construction of this air charge device appears in FIG. 2. In actual physical location, this device 84 is contained within the top cowling member 38 at the forward end thereof and has a rearward facing air inlet opening 86 through which air is introduced.

The air inlet device 84 supplies the induced air to a plurality of throttle bodies 88, each of which has a throttle valve 90 provided therein. These throttle valves 90 are supported on throttle valve shafts (not shown). These throttle valve shafts are linked to each other for simultaneous opening and closing of the throttle valves 90 in a manner that is well known in this art.

As is also typical in two stroke engine practice, the intake ports 82 have, provided in them, reed-type check valves 92. These check valves 92 permit the air to flow into the sections of the crankcase chamber 68 when the pistons 62 are moving upwardly in their respective cylinder bores. However, as the pistons 62 move downwardly, the charge will be compressed in the sections of the crankcase chamber 68. At that time, the reed type check valve 92 will close so as to permit the charge to be compressed. In addition, lubricant pumps 94 are provided for spraying lubricant into the throttle bodies 88 for engine lubrication under the control of an ECU (Electronic Control Unit) 96 that will be described more in detail later. Although it is not shown, some forms of direct lubrication may be also employed for delivering lubricant directly to certain components of the engine.

The charge which is compressed in the sections of the crankcase chamber 68 is then transferred to the combustion chambers 78 as through a scavenging system (not shown) in a manner that is well known. As best seen in FIG. 8, spark plug 98 is inserted into an opening 100 formed at a boss 101 for each combustion chamber 78. The spark plug 98, in turn, fire a fuel air charge that is formed by mixing fuel directly with the intake air via a fuel injector 102 in each combustion chamber 78. The fuel injectors 102 are solenoid type and electrically operated also under the control of the ECU 96. The fuel injectors 102 are mounted directly in the cylinder head member 74 in a specific location, as will be described, so as to provide optimum fuel vaporization under all running conditions.

As seen in FIG. Sections 1B and 1C, fuel is supplied to the fuel injectors 102 by a fuel supply system, indicated generally by the reference numeral 104. The fuel supply system 104 comprises a main fuel supply tank 108 that is provided in the hull of the watercraft with which the outboard motor 30 is associated. Fuel is drawn from this tank 108 through a conduit 110 by means of a first low pressure pump 112 and a plurality of second low pressure pumps 114. The first low pressure pump 112 is a manually operated pump and the second low pressure pumps 114 are diaphragm type pumps operated by variations in pressure in the sections of the crankcase chamber 68, and thus provide a relatively low pressure. A quick disconnect coupling (not shown) is provided in the conduit 110 and also a fuel filter 116 is positioned in the conduit 110 at an appropriate location.

From the low pressure pump 114, fuel is supplied to a vapor separator 118 which is mounted on the engine 36 or within the top cowling member 38 at an appropriate location. This fuel is supplied through a line 120. At the vapor separator end of the line 120, there is provided at a float valve (not shown) that is operated by a float 122 so as to maintain a uniform level of fuel in the vapor separator 118.

A high pressure electric fuel pump 124 is provided in the vapor separator 118 and pressurizes fuel that is delivered through a fuel supply line 126 to a high pressure pumping apparatus, indicated generally by the reference numeral 128. The electric fuel pump 124, which is driven by an electric motor, develops a pressure such as 3 to 10 kg/cm$^2$. A low pressure regulator 130 is positioned in the fuel supply line 126 at the vapor separator 118 and limits the pressure that is delivered to the high pressure pumping apparatus 128 by dumping the fuel back to the vapor separator 118.

The high pressure fuel pump 128 that can develop a pressure of, for example, 50 to 100 kg/cm$^2$ or more. A pump drive unit 132 (the lower left hand view) is provided for driving the high pressure fuel pump 128.

Figure 2:
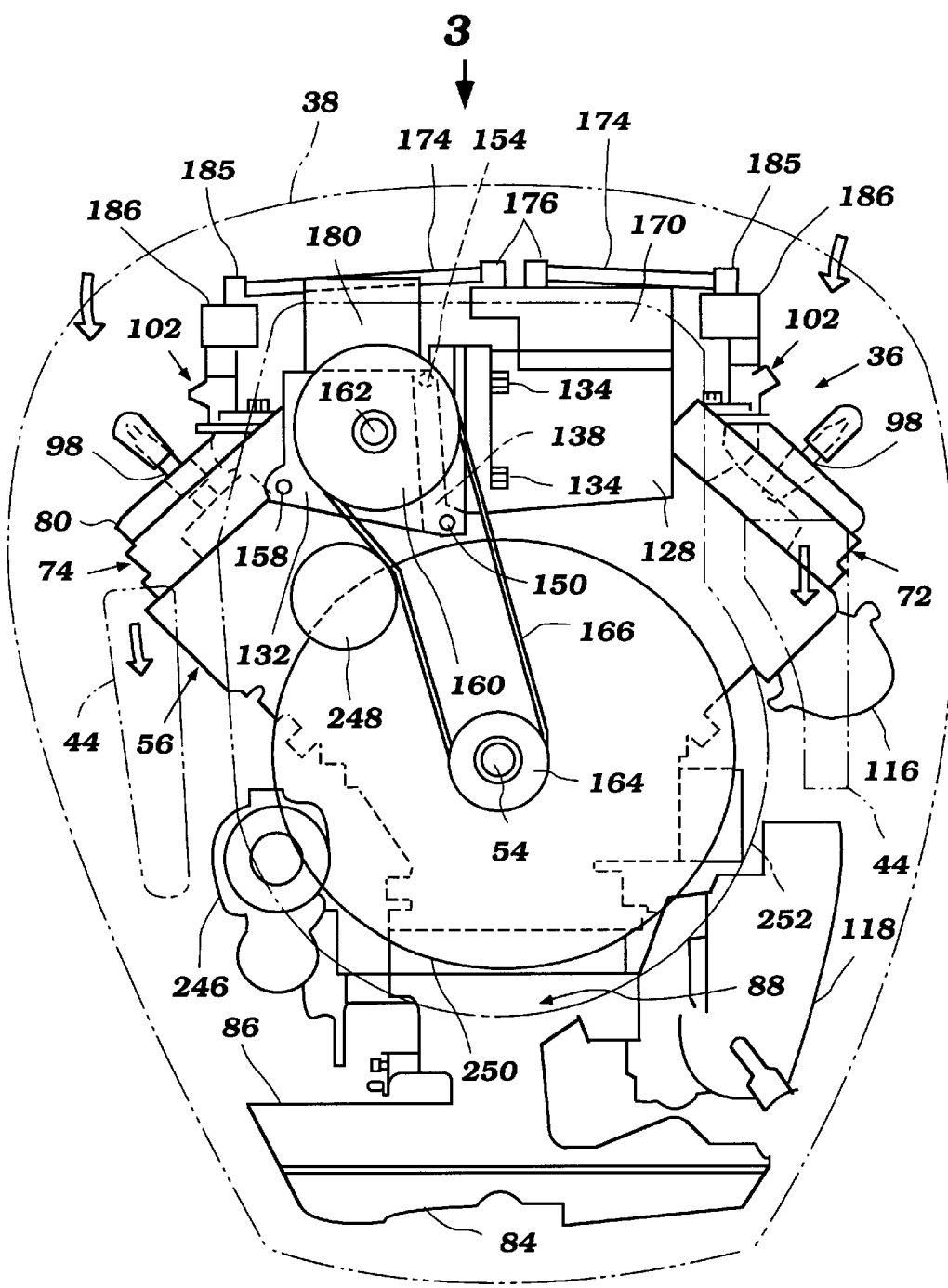
FIG. 2 is a top plan view showing a power head incorporating the engine with the engine shown in solid lines and a protective cowling shown in phantom.
Figure 3:
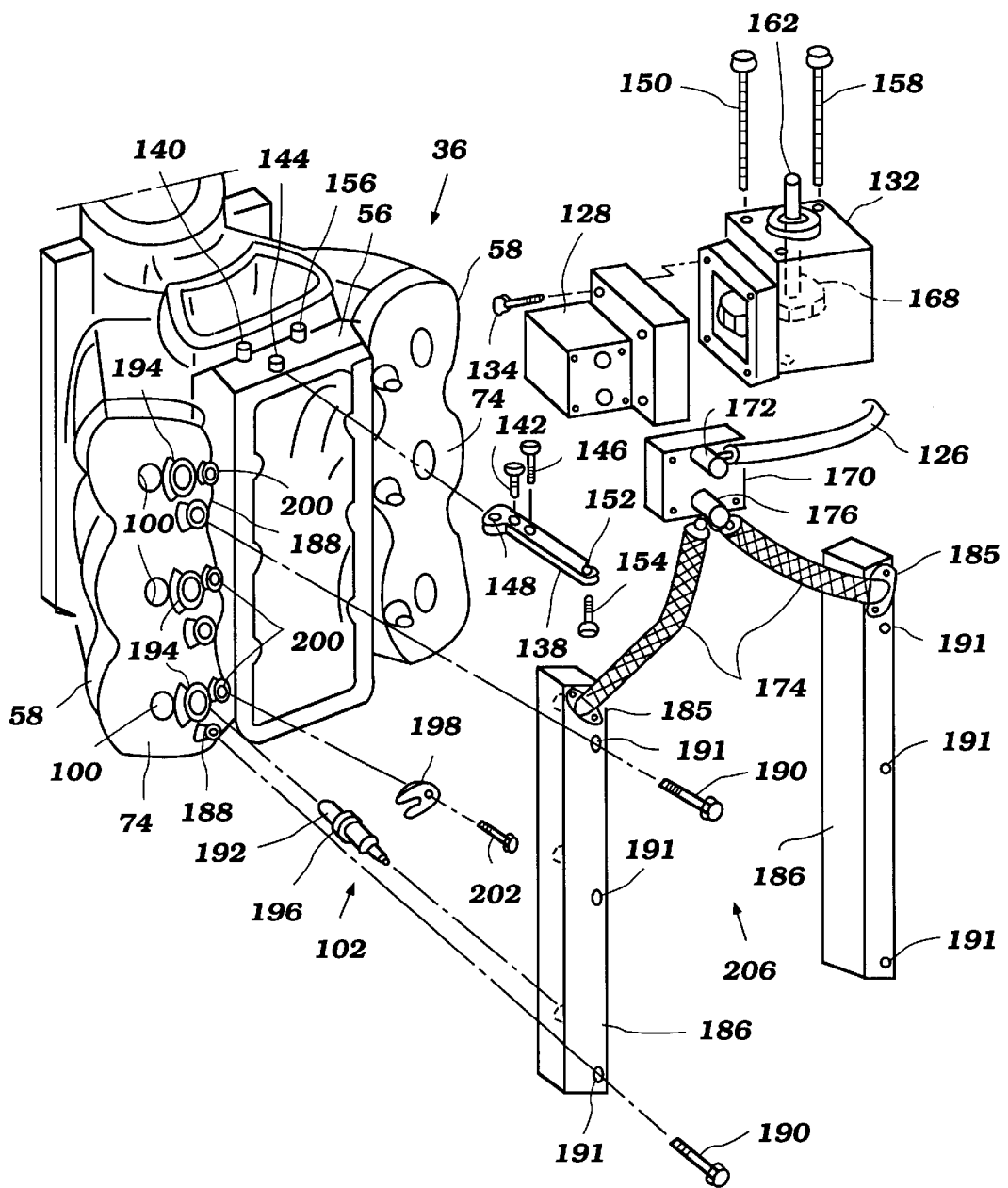
FIG. 3 is a schematic perspective view showing components relating to a high pressure fuel injection assembly exploded from the engine, and is taken generally in the direction of the arrow 3 in FIG. 2.
Figure 4:
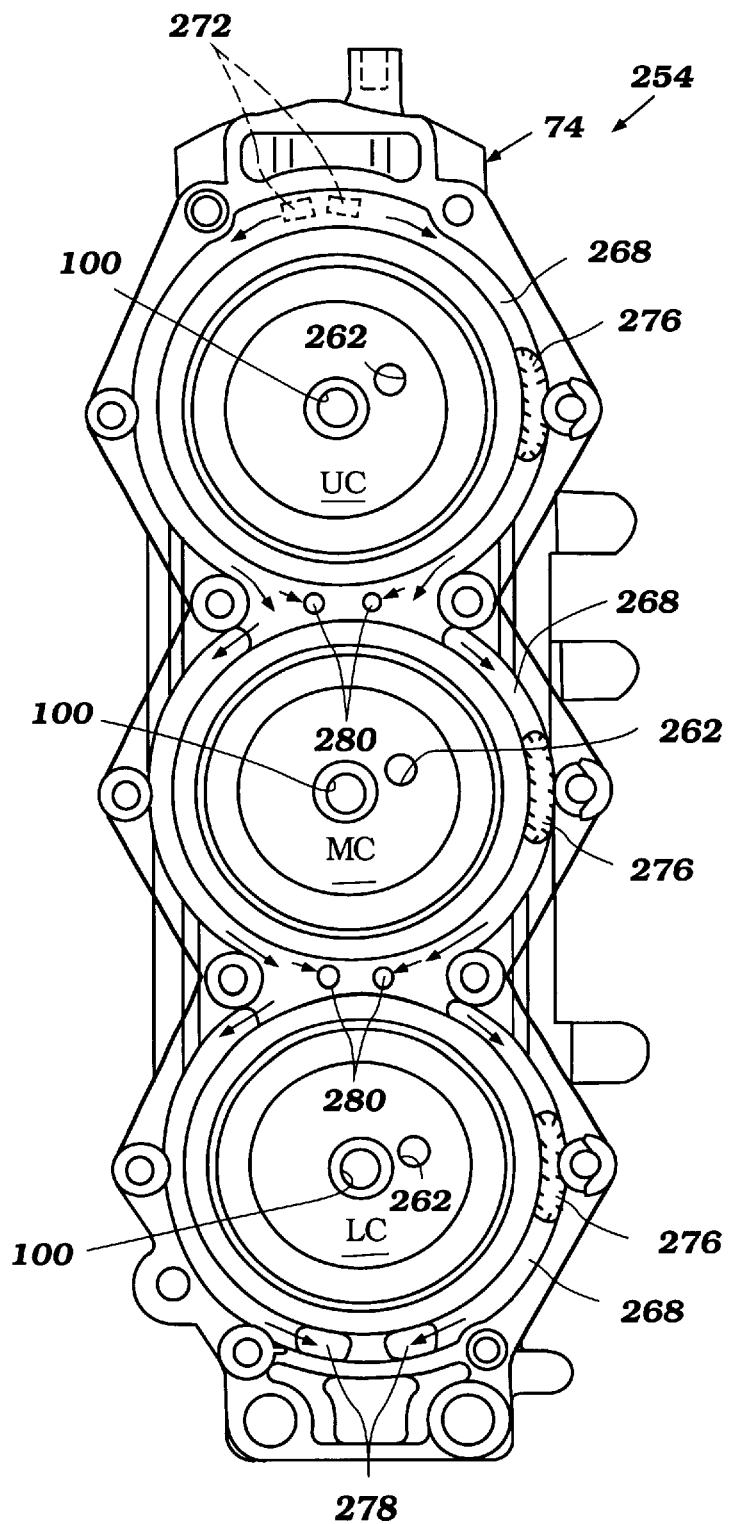
FIG. 4 is an elevational view showing a main cylinder head member taken in the direction of the arrow 4 in FIG. 8, and particularly illustrates a water flow path in a cooling system employed in the engine.

With reference primarily to FIGS. 2 and 3, the high pressure fuel pump 128 is mounted on the pump drive unit 132 with bolts 134. A stay 138 is affixed to the cylinder block 56 at a boss 140 with a bolt 142 and at a boss 144 with a bolt 146. Then, the pump drive unit 132 is affixed to the stay 138 at a bolt hole 148 with a bolt 150 and at bolt hole 152 with a bolt 154. The pump drive unit 132 is, further, affixed to the cylinder block 56 directly at a boss 156 with a bolt 158. Thus, the pump drive unit 132 overhangs between the two banks 58 of the V arrangement. A pulley 160 is affixed to a pump drive shaft 162 of the pump drive unit 132. The pulley 160 is driven by a drive pulley 164 affixed to the crankshaft 54 by means of a drive belt 166. The pump drive shaft 162 is provided with a cam disc 168 existing horizontally for pushing plungers (not shown) which are disposed on the high pressure fuel pump 128.

The high pressure fuel pump 128 has a unified fuel inlet and outlet module 170 which is mounted on a side wall of the pressure pump 128. The inlet and outlet module 170 has an inlet passage (not shown) connected to the fuel supply line 126 with a connector 172, while an outlet passage (not shown) is connected to a pair of flexible conduits 174 with a connector 176.

As seen in FIG. 1C, the pressure of the fuel supplied by the fuel pump 128 is regulated to be the fixed value by a high pressure regulator 180 which dumps fuel back to the vapor separator 118 through a pressure relief line 182 in which a fuel heat exchanger or cooler 184 is provided. It is important to keep the fuel under the constant pressure. Because the fuel amounts are determined by changes of duration of injection under the condition that the pressure for injection is always the same.

As seen in FIGS. 2 and 3, the flexible conduits 174 are connected to fuel supply rails 186 with connectors 185. The fuel supply rails 186 are made of metal so as to be rigid. The fuel supply rails 186 communicate with the flexible conduits 174 and also fuel injectors 102 when they are held on the fuel supply rails 186.

The respective fuel rails 186 are affixed to both of the main cylinder head members 74 at bosses 188 with positioning bolts 190. Apertures 191 are provided on the fuel rails 186 for the positioning bolts 190 passing through the apertures 191. The fuel injectors 102 are held between the fuel supply rails 186 and the cylinder head members 74. Mount sections 192 of the fuel injectors 102 are inserted into bosses 194 so as to be exposed to combustion chambers. Flange portions 196 of the fuel injectors 102 are supported with forked members 198 that are affixed to the cylinder head member 74 at bosses 200 with bolts 202. The flange portion 196 on each fuel injector 102 extends about the fuel injector 102, generally surrounding the injector nozzle (although the nozzle is spaced from flange portion along a longitudinal axis of the injector body). In the illustrated embodiment, the flange portion generally encircles the injector nozzle. The bosses 200 can be replaced by other positioning constructions. An additional construction is shown in FIG. 8 and will be described later.

The forked member 198 is made of anti-corrosive metal such as stainless steel and aluminum or synthetic resin. In this manner, the forked member 198 is prevented from corroding and deteriorating, and maintains its shape and integrity in order to apply a generally constant loading on the fuel injector. The fuel injector mounting construction and loading will be described in more detail below.

Although the same bosses 188, 194, 200 are provided on the cylinder head member 74 of the other bank 58, they are simply schematically shown in FIG. 3 for avoiding redundancy. The high pressure fuel pump 128, pump drive unit 132, inlet and outlet module 170, flexible conduits 174, fuel rails 186 and fuel injectors 102 are unified together. These unified components form a high pressure fuel injection assembly 206. The affixing construction including the mounting structure of the fuel injector 102 will be described more in detail with reference to FIGS. 8, 9 and 10 later.

Fuel is supplied from the high pressure fuel pump 128 to the flexible fuel conduits 174. The fuel conduits 174, in turn, deliver fuel to a pair of vertically extending fuel rails 186. The fuel rails 186, then, supply fuel to the fuel injectors 102.

As seen in FIG. 1B, after the fuel charge has been formed in the combustion chambers by the injection of fuel from the fuel injectors 102, the charge is fired by firing the spark plugs 98. The injection timing and duration, as well as the control for the timing of firing of the spark plugs 98, are controlled by the ECU 96.

Once the charge burns and expands, the pistons 62 will be driven downwardly in the cylinder bores 60 until the pistons 62 reach the lowermost position. At this time, an exhaust port (not shown) will be uncovered so as to open the communication with an exhaust passage 204 formed in the cylinder block 56. The exhaust gasses flow through the exhaust passages 204 to manifold collector sections 206 of respective exhaust manifolds that are formed within the cylinder block 56. These exhaust manifold collector sections 206 communicate with exhaust passages formed in an exhaust guide plate 42 on which the engine 36 is mounted.

A pair of exhaust pipes 208 depend from the exhaust guide plate 42 and extends the exhaust passages 204 into an expansion chamber 210 formed in the driveshaft housing 32. From this expansion chamber 210, the exhaust gasses are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 214 is provided for realizing a control strategy along which the initiation and duration of fuel injection from the fuel injector 102 and timing of firing of the spark plugs 98 are controlled. The feedback control system 214 comprises the ECU 96 and a number of sensors which sense either engine running conditions, ambient conditions or conditions of the outboard motor 30 that will effect engine performance. Certain of the sensors are shown schematically in FIG. 1 and will be described by reference to that figure.

There is provided, associated with the crankshaft 54, a crankshaft angle position sensor 216 which, when measuring crankshaft angle versus time, outputs a crankshaft rotational speed signal or engine speed signal indicated schematically at 218 to the ECU 96.

Operator demand or engine load, as determined by throttle angle of the throttle valve 90, is sensed by a throttle position sensor 220 which outputs a throttle position or load signal 222 to the ECU 96. When the operator desires to gather speed, i.e., accelerate the engine speed, a throttle on a steering handle (not shown) is operated by the operator. The throttle valve 90 is, then, going to open toward the certain open position that corresponds to the desired speed at which air charge is induced more than before into the crankcase chamber 68 through the throttle bodies 88. Also, the engine load increases, for example, when the associated watercraft advances against wind. In this situation, the operator also operates the throttle so as to recover the speed that may be lost.

A combustion condition or oxygen ($O_2$) sensor 224 is provided that senses the in cylinder combustion conditions by sensing the residual amount of oxygen in the combustion products at a time near the time when the exhaust port is opened. This output and air fuel ratio signal is indicted schematically at 226 to the ECU 96.

There is also provided a pressure sensor 228 in line connected to the pressure regulator 180. This pressure sensor 228 outputs the high pressure fuel signal to the ECU 96, which signal line is omitted in FIG. 1.

There also may be provided a water temperature sensor 230 (see the lower right-hand view) which outputs a cooling water temperature signal 232 to the ECU 96.

Further, an intake air temperature sensor 234 (see the upper view) is provided and this sensor 234 outputs an intake air temperature signal 236 to the ECU 96.

Although these are all sensors shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 96, as has been noted, outputs signals to the fuel injectors 102, spark plugs 75, the lubrication pumps 94 and the high pressure electric fuel pump 124 for their respective control. These control signals are indicated schematically in FIG. 1 at 238, 240, 242 and 244, respectively.

In addition (see FIG. 2), a starter motor 246 for starting the engine 36, a tensioner 248 for giving tension to the belt 166, a flywheel 250 and a cover member 252 for covering the rotating components such as the high pressure fuel pump 128 are provided.

The outboard motor 30 has an engine cooling system. With reference to FIGS. 4 through 8, primarily the cooling system will now be described below. The mounting structure of the fuel injector 102 will be partly included in the following descriptions.

The engine cooling system is generally indicated with the reference numeral 254. Actually, the main cylinder head member 74 of the cylinder head assembly 72 is affixed to the cylinder block 56 via a gasket 256 (see FIG. 7). The main cylinder head member 74 has the aforenoted boss 194 for holding the mount section 192 of the fuel injector 102 (see FIG. 8). The axis of the boss 194 has a certain angle relative to the cylinder bore axis 258 so that the fuel injector 102 is placed slantwise relative to the axis 258. Injection nozzles 260 of the fuel injectors 102 are exposed to the combustion chambers 78 through openings 262 formed at the bottom of the recess in the bosses 194. The injection nozzles 260 have a single or a plurality of injection apertures. The fuel injector 102 and the spark plug 98 are adjoined each other.

A gasket 264 is provided between the main cylinder head member 74 and the cylinder head cover member 80. The cylinder head cover member 80, main cylinder head member 74 and cylinder block 56 are securely connected with connecting bolts (not shown) in a known manner.

Figure 7:
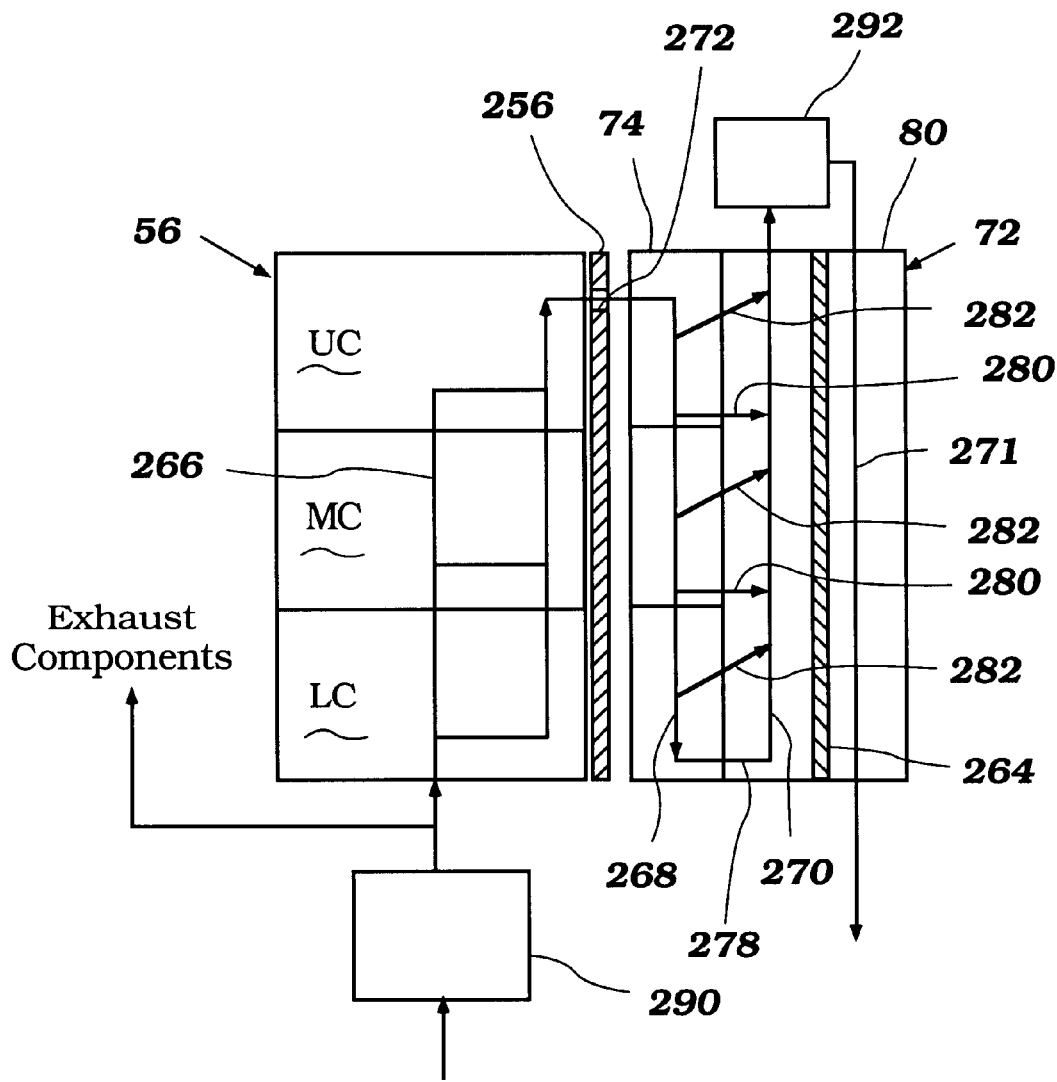
FIG. 7 is a schematic view generally showing the entire water flow path in the cooling system.

As schematically shown in FIG. 7, a cooling jacket 266 is formed circumferentially around the cylinder bore 60. Another cooling jacket or cylinder head upstream jacket 268 is also formed circumferentially around the recess 76 of the main cylinder head member 74. Also, generally around the bosses 101 for the spark plug 98 and at periphery of the bosses 194 for the fuel injector 102 in the cylinder head member 74, still another cooling jacket or cylinder head downstream jacket 270 is formed. Further, the cylinder head cover member 80 also has a cooling jacket 271 (see FIG. 7). This cooling jacket 271 does not appear in FIG. 8.

The gasket 256 has upper communication apertures 272 at its almost uppermost portion (see FIGS. 4 and 7) so as to allow water flowing into the cylinder head upstream jacket 268 from the cylinder block cooling jacket 266. Cavities 276 are located in the upstream jacket 268 (see FIGS. 6 and 8) and in the close proximity to the bosses 194 for the mount sections 192 of the fuel injectors 102. That is, the cavities 276 are formed deeper than the other part of the cylinder head upstream jacket 268. Because of this, cooling water is permitted to approach closer to the mount sections 192 of the fuel injectors 102.

Lower communication apertures 278 are provided at the almost lowermost portion of the main cylinder head member 74 to discharge the water from the cylinder head upstream jacket 268 and then supply it to the downstream jacket 270. Middle communication apertures 280 are provided between the upper cylinder UC and the middle cylinder MC and also between the middle cylinder MC and the lower cylinder LC for allowing water, again, to flow from the upstream jacket 268 to the downstream jacket 270.

Figure 5:
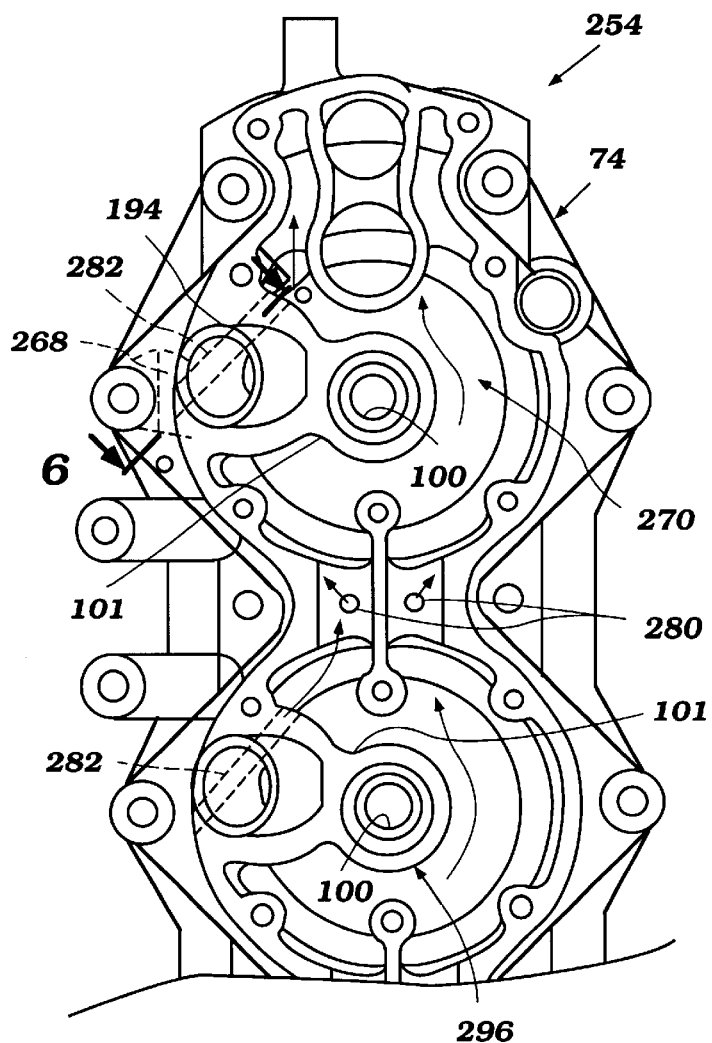
FIG. 5 is an elevational and upper partial view showing the same main cylinder head member taken in the direction of the arrow 5 in FIG. 8 and illustrates particularly another section of the water flow path in the same cooling system.
Figure 6:
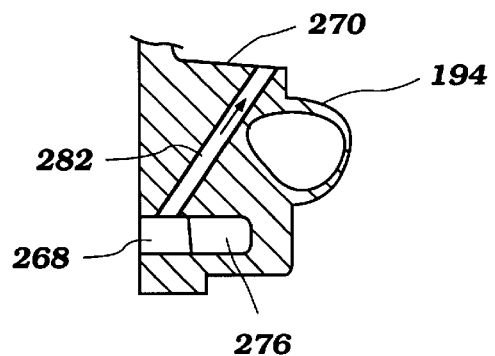
FIG. 6 is a cross-sectional view showing the same main cylinder head member of FIG. 5 taken along the line 6—6 in FIG. 5.

Bypasses 282 are provided at the respective cylinders UC, MC and LC for further cooling the respective fuel injectors 102. As best seen in FIGS. 5 and 6, the bypasses 282 are placed directly under the fuel injector bosses 194 and allow water to flow from the downstream jacket 270 to the other water passage 229. The water flowing through these bypasses 282 can take heat away from the main cylinder head member 74 around the bypasses 282, which includes the fuel injector bosses 194.

The water flow in this cooling system 254 will be again described more in detail with reference to FIG. 7. Water is introduced into the cooling system 254 from the body of water surrounding the outboard motor 30 by means of a water pump 290. Some amounts of this water is used for cooling the exhaust system and the reminder of the water is supplied to the cylinder block cooling jacket 266 for cooling the cylinder block 56 (the respective cylinders UC, MC and LC). Next, the water goes into the cylinder head upstream jacket 268 through the upper communication apertures 272. Primarily, the water is then flow into the downstream jacket 270 through the lower communication apertures 278. However, additionally, some of the water goes into the downstream jacket 270 en route through middle communication apertures 280. The water flow in the cylinder head upstream jacket 268 and the downstream jacket 270 cools the body of the main cylinder head member 74.

Further, in this embodiment, the water in the upstream jacket 268 goes into the downstream jacket 270 through the bypasses 282. During flowing through these bypasses 282, the water expedites the cooling effect of the fuel injector bosses 194 and eventually the cooling effect of the fuel injectors 102.

The water, then, goes to a thermostat compartment 292 wherein a conventional thermostat is placed. After passing through the thermostat compartment 292, the water goes to the water jacket 271 in the cylinder head cover member 80 for cooling this portion and finally is discharged to the body of water outside of the outboard motor 30.

As described above, because the cylinder head upstream jacket 268, downstream jacket 270, cavities 276 and bypass passages 282 are provided in this cooling system 254, the fuel injectors 102 and spark plugs 98 are effectively cooled down as well as the cylinder head assembly 72. In addition, the bolt 202 is positioned at an generally opposite place of the spark plug 98 relative to the fuel injector 102. Accordingly, the bolt 202 will not prevent cooling water from flowing smoothly in such an limited narrow space.

The mounting construction of the fuel injectors 102 will now be described in detail with reference to FIGS. 8 through 12. Although a plurality of fuel injectors 102 are mounted for multiple cylinders of the engine 36 in this embodiment, one fuel injector 102 will represent the other injectors because the same structure can be applied for them.

As described above, the forked member 198 is used for securing the fuel injector 102 onto the main cylinder head member 74 and further for exerting a loading or thrust force upon the fuel injector 102 toward the combustion chamber 78. Thus, the forked member functions as a thrust member. As best seen in FIGS. 11(A) to (C), the forked member 198 generally has two sections: a fixing section 294 and a forked or thrust section 295. The forked section 295 is formed with thrust portions 296 and an intermediate portion 298. In the illustrated embodiment, the fixing section 294 has convex surfaces 299, which curvature is R1, on both sides. The thrust portions 296 also have convex surfaces 300, which curvature is R2, at least on the side contacting the flange 196. The intermediate portion 298 has concave surfaces unlike the fixing section 294 and the thrust portion 296. As understood from FIGS. 11B and 11C, the fixing portion 294 is curved in a lateral direction, while the thrust portions 296 are curved in a longitudinal direction. This allows the forked member 198 to roll and pitch relative to the fuel injector flange 196 and the mounting surface of the cylinder head member 74 when assembled, as noted below.

The fixing section 294 has a bolt hole 301 which allows the fixing section 294 to pivot or yaw for position adjustment relative to the fuel injector 102, as described below. The bolt 202 is a special bolt as shown in FIG. 12 and used for affixing the forked member 198 to the cylinder head member 74 as a fixing member. That is, the bolt 202 has a protrusion 306 which has a generally partial spherical surface at its periphery and under its head portion 308. The fixing section 294 has, therefore, a generally partial spherical recess 310 around the bolt hole 300 to receive the spherical protrusion 306.

The main cylinder head member 74 has a relatively shallow hollow portion 312. Because the fixing section 294 is projected from the intermediate portion 298, the forked member 198 can be positioned at the hollow 312 and registered with a projected surface 299. That is, the forked member 198 can be temporarily placed and aligned on the cylinder head member 74 before it is fixed to the cylinder head member 74 for the accurate positioning.

The mount section 192 of the fuel injector 102 is formed between the flange 196 and the injection nozzle 260. This mount section 192 has a diameter larger than a diameter of the injection nozzle 260 but smaller than a diameter of the flange 196. An opening 316, of a diameter larger than a diameter of the nozzle opening 262, is formed at the boss 194 in the cylinder head member 74 so that these openings 262, 316 are sections of a single opening. A step portion 318 occurs at the transition between the large opening 316 and the small opening 262. The mount section 192 of the fuel injector 102 is seated at this step portion 318. A disc spring 320 is provided between the mount section 192 and the step portion 318 to seal up this area.

The flange 196 has a surface 321 at which the thrust portions 296 of the forked member 198 contact. The surface 321 is generally flat.

The forked member 198 is affixed to the cylinder head member 74 with the bolt 202. The forked section 295 receives the fuel injector 102 between the thrust portions 296. When the bolt 202 is fastened tight, the thrust portions 296 apply a force on the fuel injector flange 196 in a direction toward the combustion chamber 78. That is, the forked member 198 acts as a leaf spring and loads the fuel injection in a direction toward the step 318. In particular, the forked member 198 directly exerts the thrust force or loading onto the contact surface 321 of the flange 196 with the thrust portions 296. This loading is also exerted upon the disc spring 320 so that the spring 320 is compressed and seals the area between the cylinder head member 74 and the fuel injector 102.

The forked member 198 applies a generally uniform loading about the flange 196, and thus on the disc spring 320 despite manufacturing tolerances. In accordance with the embodiment of the present invention, the forked member 198 has the fixing section 294 and the forked section 295, both of which have the convex surfaces 299, 300 with curvatures of R1 and R2, respectively. These convex surfaces 299, 300 allow the forked member 198 to incline itself. That is, the forked member 198 has a self adjustment function in positioning that allows the forked member 198 to assume a variety of orientations relative to the cylinder head member 74 so as to accommodate for manufacturing tolerances while still squarely loading the fuel injection 102 relative to the step 318 (i.e., the applied force is generally normal to the step 318). Accordingly, any distorted or nonuniform loading on the disc spring 320 can be avoided and hence the sealing effect by the disc spring 320 can be uniform. As a result, gasses leak and carbon deposits on the injection nozzle 260 are inhibited.

The self-orienting feature can also be accomplishes by forming the convex surface of the cylinder head member 74 with a curved surface that acts a fulcrum over which the fixing section 294 can pitch, roll and/or yaw in order to allow the fuel injector flange 196 to sit squarely against the step 318 within the opening. In this variation, the curved protrusion lies on the surface of the cylinder head within the hollow 312 with the mounting hole for the bolt 202 being positioned generally at the center of the curved protrusion. The curved protrusion preferably has a radius of curvature RI. This construction thus can be used with a forked member 198 having a flat fixing section 294 and convex thrust portions 296.

Preferably both mounting constructions would also include the combination of the spherical bolt protrusion 306 and the spherical recess in the forked member 198. This allows the forked member 198 to be fixed to the cylinder head member 74 without imparting a significant force in an oblique or parallel direction relative to the step 318.

In addition, the combination of the spherical protrusion 306 of the bolt 202 with the spherical recess 310 also inhibits unintentional loosing of the bolt 202. This is particularly useful for the forked member 198. That is, due to the curved configuration of the forked member 198, the bolt 202 can loosen. However, because of the combination of the spherical protrusion 306 and the spherical recess 310, the looseness of the bolt 202 can be inhibited. It should be noted that the protrusion 306 having the partial spherical surface and the same configured recess 310 of the forked member 198 is dispensable if the bolt 202 would not loosen, for instance, if other types of locking mechanisms are used (e.g., a lock washer).

The fuel injector 102 has its own axis, while the bolt 202 has also its own axis. After being affixed, both of the axes extend parallel relative to each other. Also, the contact surface 321 of the flange 196 and chord lengths across the ends of the convex surfaces 299 of the forked member 198 extend generally normal to the axes.

Figure 13:
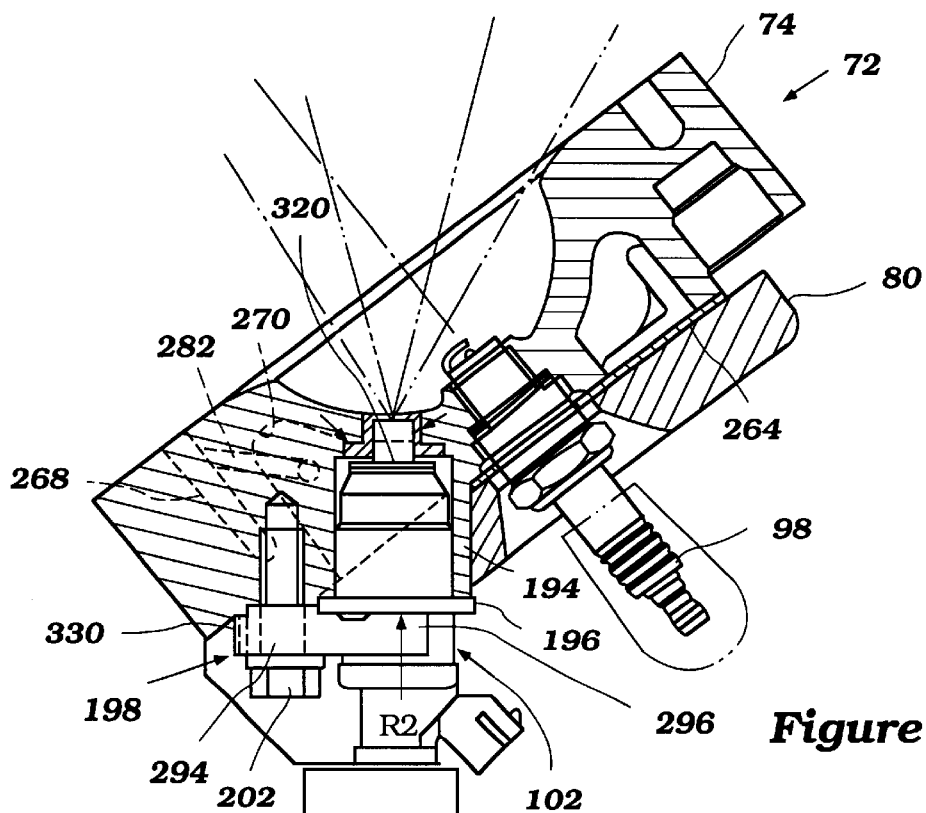
FIG. 13 is a cross-sectional plan view showing another preferred embodiment of the the mounting construction.
Figure 14:
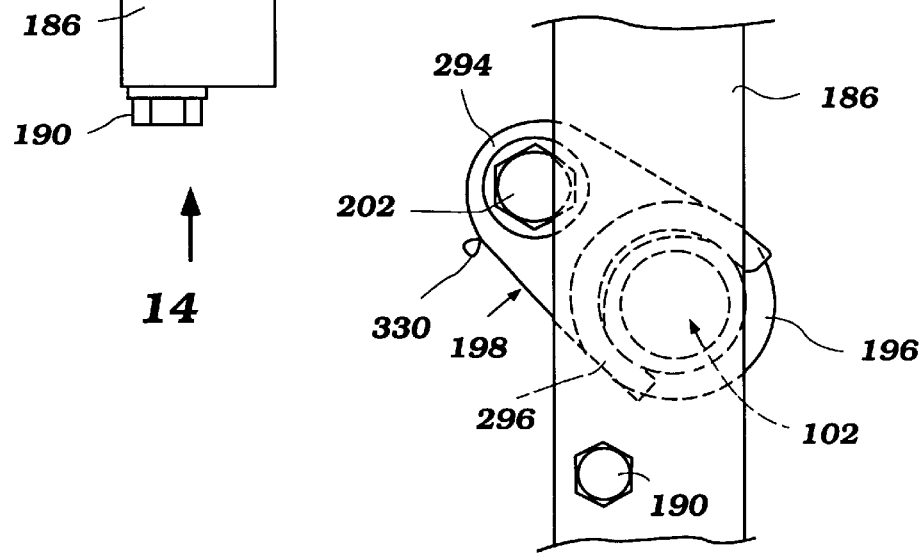
FIG. 14 is an enlarged partial elevational view showing the same mounting construction taken in the direction from the arrow 14 in FIG. 13.

With reference to FIGS. 13 and 14, another arrangement for temporarily supporting the forked member 198 will be described. The same members already described by reference to FIGS. 1 through 12 will be assigned with the same reference numerals and not described again for avoiding redundancy. Additionally, these same members will also be ascribed the same reference numerals in connection with the description of the embodiments illustrated in FIGS. 15 and 16. The above description of these members, which are common among the embodiments, therefore applies equally to all embodiments unless indicated otherwise.

In this arrangement, pins 330 are connected to the cylinder head member 74 and act as projections at respective positions on the main cylinder head member 74. The pins 330 can temporarily support the forked members 198 instead of the hollows 312 shown in FIG. 8.

Figure 15:
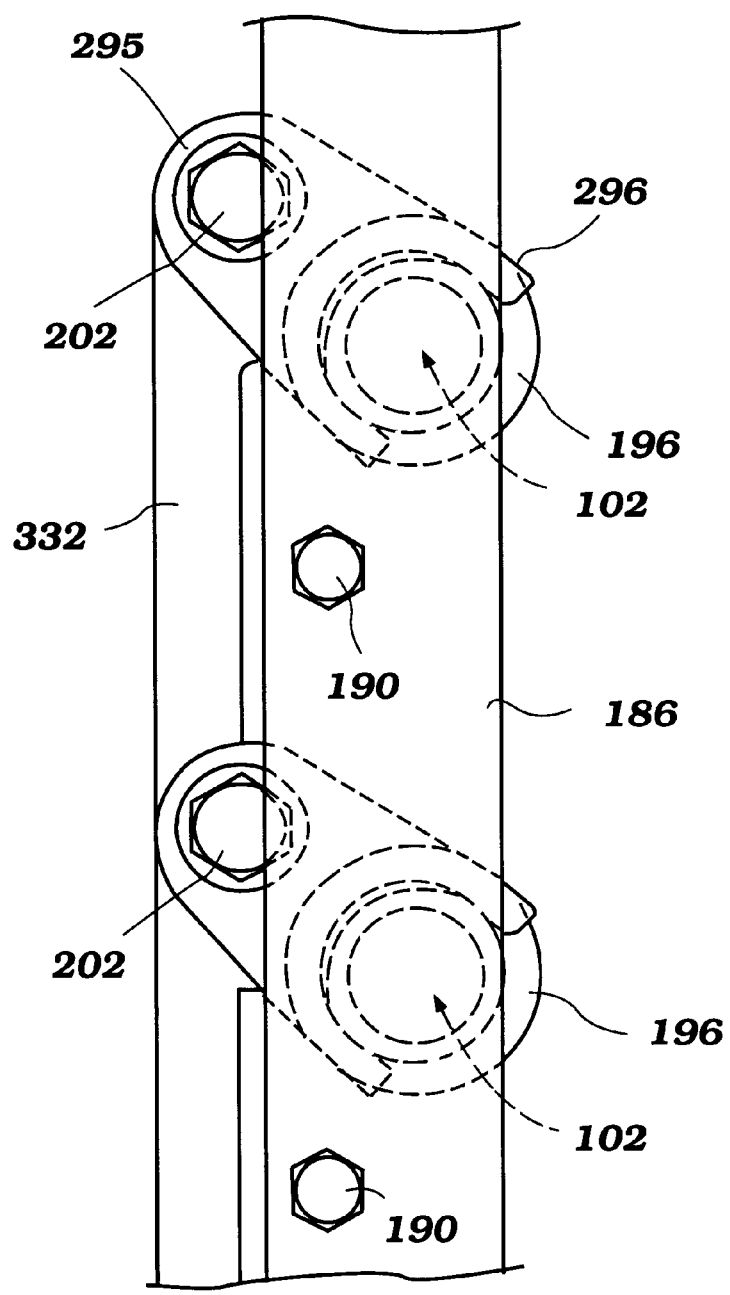
FIG. 15 is an enlarged elevational view showing and additional embodiment of the mounting construction.
Figure 16:
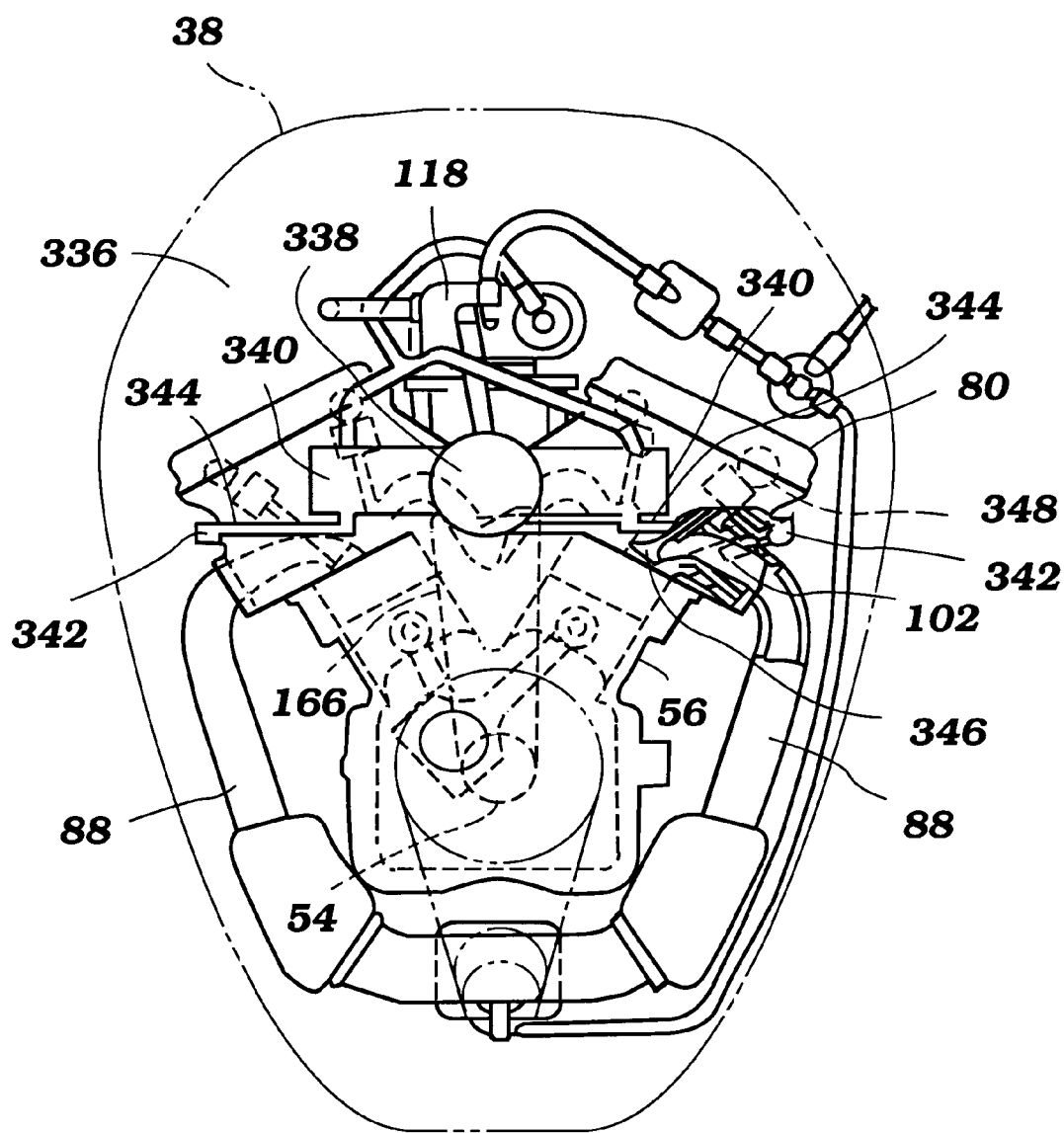
FIG. 16 is a top plan view showing a power head which incorporates a four stroke engine that can be provided with the embodiment of the present invention, with the engine shown in solid lines and a protective cowling shown in phantom.

With reference to FIG. 15, still another arrangement for temporarily supporting the forked member 198 will be described. In this arrangement, the forked members 198 are unified with each other. That is, the respective forked members 198 are joined with the connecting sections 332.

The features of the present invention can be embodied in an engine other than the two stroke, crankcase compression engine as described above. For instance, a four stroke engine such as an engine 336 shown in FIG. 16 can employ the features. In this engine 336, a pump drive unit 338 is provided on the engine 336 and a pair of high pressure fuel pumps 340 are located at both sides of the pump drive unit 338. A pair of fuel supply rails 342 are provided and connected with the high pressure fuel pumps 340 with flexible conduits 344. Special components for the four stroke engine 336 are, for example, an intake valve 346 and a camshaft 348.

The features and aspects of the present invention are applicable not only to outboard motors but also to other engines for marine propulsion systems such as stem drive systems, for land vehicles such as motorcycles and automobiles, and for utility machines such as lawn mowers. Stationary engines can also employ them.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A direct fuel injected, internal combustion engine comprising an engine body defining, at least in part, at least one combustion chamber, a fuel injector arranged to spray fuel directly into the combustion chamber, the engine body having an opening through which the fuel injector is inserted, the fuel injector having a contact surface, a thrust member arranged to exert a loading onto the contact surface toward the combustion chamber, a fixing member affixing the thrust member onto the engine body, a seal member disposed within a space existing between the fuel injector and the opening, the thrust member including a thrust section contacting the contact surface of the fuel injector and a fixing section at which the thrust member is affixed onto the engine body by the fixing member, the fixing section having a curved convex surface, and the fixing member having an axis generally extending through an apex of the curved convex surface.

2. A direct fuel injected, internal combustion engine as set forth in claim 1, wherein the fuel injector has an axis extending generally parallel to the axis of the fixing member, and both the contact surface and a chord length of the curved convex surface extend generally normal to the axes.

3. A direct fuel injected, internal combustion engine as set forth in claim 2, wherein the fixing member has a generally partial spherical surface, the fixing section of the thrust member has a generally partial spherical recess, and the spherical surface of the fixing member is received at the spherical recess of the thrust member.

4. A direct fuel injected, internal combustion engine as set forth in claim 3, wherein the fixing member is a bolt having a bolt head, and the spherical surface is formed at the periphery thereof and under the bolt head.

5. A direct fuel injected, internal combustion engine as set forth in claim 1, wherein the opening in the engine body is formed with a small diameter section and a large diameter section to define a step portion therebetween, and the seal member is disposed at the step portion.

6. A direct fuel injected, internal combustion engine as set forth in claim 5, wherein the seal member is a disc spring.

7. A direct fuel injected, internal combustion engine as set forth in claim 1, wherein the fixing section of the thrust member has two sides, and both of the sides are configured as the curved convex surface.

8. A direct fuel injected, internal combustion engine as set forth in claim 1, wherein the thrust member is configured as a forked shape.

9. A direct fuel injected, internal combustion engine as set forth in claim 1, wherein the engine body includes an engine block and a cylinder head, the engine block defining at least one cylinder bore in which a piston reciprocates, and the cylinder head is affixed to one end of the engine body and closes the cylinder bore, the cylinder head, together with the cylinder bore and piston, define the combustion chamber.

10. A direct fuel injected, internal combustion engine as set forth in claim 9, wherein the engine block defining a plurality of the cylinder bores, a plurality of the fuel injectors are provided corresponding to the cylinder bores, a plurality of the thrust members are provided corresponding to the fuel injectors, and the thrust members are unified with each other.

11. A direct fuel injected, internal combustion engine as set forth in claim 9, wherein the thrust member has an intermediate section between the thrust section and the fixing section, and the cylinder head has a hollow portion at which the fixing section is nested.

12. A direct fuel injected, internal combustion engine as set forth in claim 9, wherein the cylinder head has a projection, and the thrust member is positioned by registering the fixing section relative to the projection.

13. A direct fuel injected, internal combustion engine as set forth in claim 9, wherein the cylinder head has a spark plug for firing the fuel and a coolant jacket disposed generally around the spark plug, the fuel injector and the spark plug are adjacent each other, and the fixing member lies on a side of the fuel injector generally opposite of the spark plug.

14. A direct injected, internal combustion engine as set forth in claim 9, wherein the cylinder head has at least two coolant jackets, both of the coolant jackets are connected with each other through a passage, and the passage is disposed in proximity to the fuel injector.

15. A direct injected, internal combustion engine as set forth in claim 9, wherein the engine additionally comprises an output shaft driven by reciprocal movement of the piston, and a high pressure fuel pump is driven by the output shaft to supply pressurized fuel to the fuel injector.

16. A direct injected, internal combustion engine as set forth in claim 1, wherein the engine includes a passage interconnecting the combustion chamber with a crankcase chamber.

17. A direct injected, internal combustion engine as set forth in claim 1, wherein the engine additionally includes at least one exhaust valve regulating exhaust flow from the combustion chamber.

18. A direct injected, internal combustion engine as set forth in claim 17, wherein the engine additionally includes at least one intake valve selectively opening to permit air flow into the combustion chamber.

19. A direct injected, internal combustion engine as set forth in claim 1 in combination with a marine propulsion device, wherein the engine additionally comprises an output shaft coupled to the marine propulsion device.

20. A direct fuel injected, internal combustion engine comprising an engine body defining, at least in part, at least one combustion chamber, a fuel injector arranged to spray fuel directly into the combustion chamber, the engine body having an opening through which the fuel injector is inserted, the fuel injector having a contact surface, a thrust member arranged to exert a loading onto the contact surface toward the combustion chamber, a fixing member affixing the thrust member onto the cylinder head, a seal member disposed within a space existing between the fuel injector and the opening, the thrust member including a thrust section contacting the contact surface of the fuel injector and a fixing section having a curved convex surface at which the thrust member is affixed onto the cylinder head by the fixing member, the fixing member having an axis generally extending through an apex of the curved convex surface, the seal member being pressed in a direction along an axis of the fuel injector under the condition that the fixing member affixes the thrust member onto the cylinder head, and means for balancing the loading about the contact surface of the fuel injector.

21. A direct fuel injected, internal combustion engine as set forth in claim 1, wherein the thrust section and the fixing section are unitary, the thrust section having a curved convex surface at which the thrust section contacts the contact surface of the fuel injector.

22. A direct fuel injected, internal combustion engine comprising an engine body defining, at least in part, at least one combustion chamber, a fuel injector arranged to spray fuel directly into the combustion chamber, the engine body having an opening through which the fuel injector is inserted, the fuel injector having a contact surface, a thrust member arranged to exert a loading onto the contact surface toward the combustion chamber, a fixing member affixing the thrust member onto the engine body, and a seal member disposed within a space existing between the fuel injector and the opening, the thrust member including a thrust section contacting the contact surface of the fuel injector and a fixing section at which the thrust member is affixed onto the engine body by the fixing member, the thrust section and the fixing section being unitary, the thrust section having a curved convex surface at which the thrust section contacts the contact surface of the fuel injector.

23. A direct fuel injected, internal combustion engine as set forth in claim 22, wherein the opening in the engine body is formed with a small diameter section and a large diameter section to define a step portion therebetween, the seal member being disposed at the step portion.

24. A direct fuel injected, internal combustion engine as set forth in claim 23, wherein the seal member is a disc spring.

25. A direct fuel injected, internal combustion engine as set forth in claim 22, wherein the engine body includes an engine block and a cylinder head, the engine block defining at least one cylinder bore in which a piston reciprocates, the cylinder head being affixed to one end of the engine body and closing the cylinder bore, the cylinder head, together with the cylinder bore and piston, defining the combustion chamber.

26. A direct fuel injected, internal combustion engine as set forth in claim 25, wherein the cylinder head has a projection, the thrust member being positioned by registration of the axing section and the projection.

27. An internal combustion engine comprising an engine body defining at least one combustion chamber and a through-hole communicating with the combustion chamber, a fuel injector inserted into the through-hole so as to spray fuel toward the combustion chamber, the fuel injector having a flange extending generally normal to an axis of the fuel injector, the flange defining a generally flat surface, a seal member positioned within a space existing between the fuel injector and the through-hole, and a loading member includ-ing a loading section abutting on the flange and a fixing section at which the loading member is affixed onto the engine body, the loading section having a curved convex surface at which the loading section contacts the flat surface of the flange.

28. An internal combustion engine comprising an engine body defining at least one combustion chamber and a through-hole communicating with the combustion chamber, a fuel injector inserted into the through-hole so as to spray fuel toward the combustion chamber, the fuel injector having a flange generally extending normal to an axis of the fuel injector, a seal member positioned within a space existing between the fuel injector and the through-hole, a loading member including a loading section abutting on the flange and a fixing section at which the loading member is affixed onto the engine body, and a fastening member affixing the loading member to the engine body at the fixing section, the fixing section having a curved convex surface, the fastening member having an axis extending generally through an apex of the curved convex surface.

29. A direct fuel injected, internal combustion engine comprising an engine body defining, at least in part, at least one combustion chamber, a fuel injector arranged to spray fuel directly into the combustion chamber, the engine body having an opening through which the fuel injector is inserted, the fuel injector having a contact surface, a thrust member arranged to exert a loading onto the contact surface toward the combustion chamber, a fixing member affixing the thrust member onto the cylinder head, a seal member disposed within a space existing between the fuel injector and the opening, the thrust member including a thrust section contacting the contact surface of the fuel injector and a fixing section having a curved convex surface at which the thrust member is affixed onto the cylinder head by the fixing member, the fixing section having a curved convex surface, and an aperture extending through an apex of the curved convex surface.

30. A direct fuel injected, internal combustion engine comprising an engine body defining, at least in part, at least one combustion chamber, a fuel injector arranged to spray fuel directly into the combustion chamber, the engine body having an opening through which the fuel injector is inserted, the fuel injector having a contact surface, a thrust member having a longitudinal axis and arranged to exert a loading onto the contact surface toward the combustion chamber, a fixing member affixing the thrust member onto the cylinder head, a seal member disposed within a space existing between the fuel injector and the opening, the thrust member including a thrust section contacting the contact surface of the fuel injector and a fixing section having a curved convex surface at which the thrust member is affixed onto the cylinder head by the fixing member, the fixing section having a curved convex surface configured such that the thrust member may pivot about an axis generally parallel with respect to the longitudinal axis.

* * * * *

UNITED STATES PATENT AND TRADEMARK OFFICE
CERTIFICATE OF CORRECTION

PATENT NO.    : 6,302,088 B1
DATED         : October 16, 2001
INVENTOR(S)   : Masahiko Kato It is certified that error appears in the above-identified patent and that said Letters Patent is hereby corrected as shown below:

<u>Column 15,</u>
Line 48, please change "axing" to -- fixing --.

Signed and Sealed this

Thirteenth Day of January, 2004

JON W. DUDAS
*Acting Director of the United States Patent and Trademark Office*